NUMBER TESTING ARRANGEMENT
Filed May 13, 1959
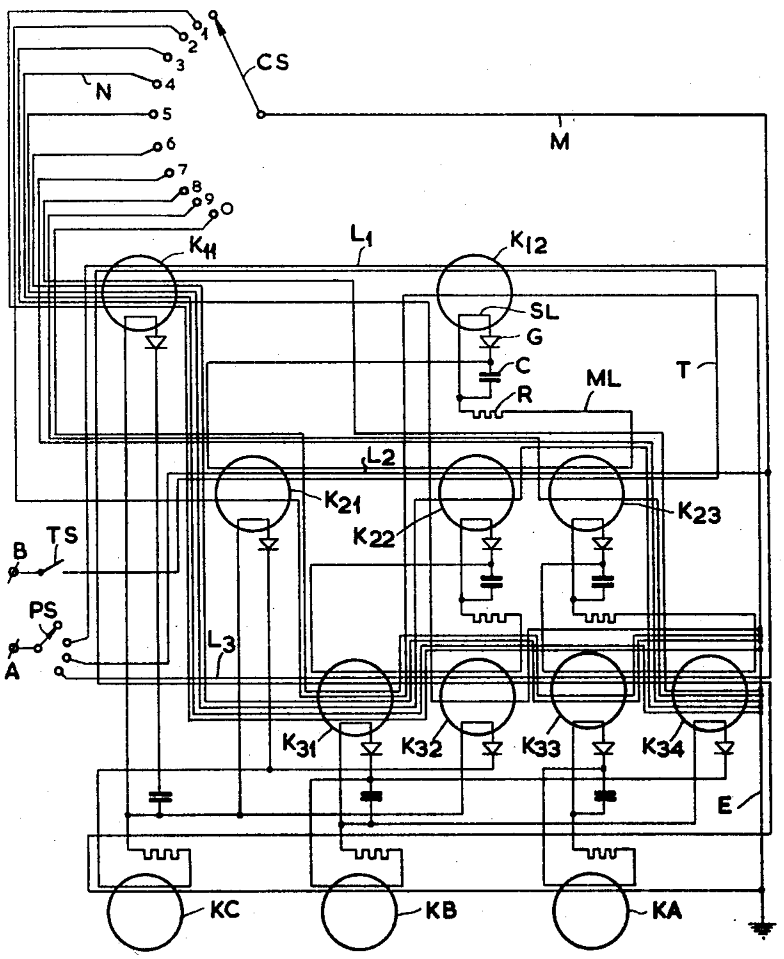
INVENTOR
JOHANNES MARTINUS BROUWER
BY Frank R. Jeifari
AGENT

United States Patent Office 3,123,809

Patented Mar. 3, 1964

3,123,809

NUMBER TESTING ARRANGEMENT

Johannes Martinus Brouwer, Hilversum, Netherlands, assignor to North American Philips Company, Inc., New York, N.Y., a corporation of Delaware Filed May 13, 1959, Ser. No. 812,987
Claims priority, application Netherlands June 4, 1958
9 Claims. (Cl. 340—174)

This invention relates to arrangements for testing numbers as to the presence of significant digit groups, the digits of which may occur in two or more positions.

Such arrangements are used, for example, in automatic trunk call telephony for determining the exchange area from the office code selected. For this purpose, the conventional time-zone transmitters utilize a cascade of selectors, the stages of which are adjusted by the sequential digits of the office code. The relevant apparatus is very expensive and bulky.

In telephony there are several other cases in which certain switching operations must be performed upon occurrence of determined groups of digits in a selected number. For this purpose, the number must be tested as to the presence of the relevant groups of digits. Some examples thereof are:

(*a*) the switching-off of certain apparatus, such as pulse transmitters, or pulse generators for converting push-button criteria into groups of pulses, after receipt of the last digits, for which purpose it must be determined how many digits in total will be chosen from the office code selected;

(*b*) the switching-in of a busy-tone producer or a breakdown device in selecting a number which is non-existing;

(*c*) the switching-over to a cross connection, if it appears from the office code selected that the call need not be led through a sector exchange or a trunk exchange.

In addition, also in other branches of engineering, there is often a need for means which permit of determining the presence of certain groups of digits in a given number, for example in dealing with statistic information with the aid of punched card machines.

An object of the invention is to provide a simple and inexpensive arrangement which permits of testing numbers as to the presence of significant groups of digits for all the above-mentioned purposes.

According to the invention, a row of ferromagnetic cores each having two stable conditions of magnetisation is provided for each position, the cores of the first row initially being in a given (positive) condition of magnetisation and the cores of the other rows being in the opposite (negative) condition of magnetisation. After receipt of each digit of the number to be tested, a current is supplied to a conductor which is coupled to all the cores of the row corresponding to the position of the digit, and to a conductor which corresponds to the value of the digit and which is coupled to the cores of the different rows in a pattern determined by the composition of the significant groups of digits, so that in the relevant row one or more cores, insofar they are in the positive condition of magnetisation, are brought into the negative condition of magnetisation. By means of a shift circuit, the cores either control a member for determining a criterion, or bring one or more cores of the subsequent row into the positive condition of magnetisation.

The term "rows" is used herein only to indicate that a plurality of cores is associated with each position and it need not imply that the cores are geometrically positioned in rows. The expressions "positive" and "negative" are used only to distinguish between the two conditions of magnetisation of the cores and they do not relate to the direction of the course of the lines of force.

In one efficacious embodiment of the arrangement, the cores are brought into their initial condition by the supply of a current pulse to one or more backsetting conductors, which are coupled in a given sense to the cores of the first row and, in the opposite sense, to the cores of the other rows.

The conductor which is coupled to all the cores of the row corresponding to the position of the digit may be selected by means of a position switch, which is switched on one step upon receipt of each digit. This switch may be of the rotary type, but may alternatively comprise a pyramid of relay contacts, electron valves or transistors.

In order to select the conductor corresponding to the value of the digit, use may advantageously be made of a digit selector, which is re-adjusted by each digit of the number to be tested. This selector may be either in the form of a rotary switch or of a pyramid of relay contacts, electron valves or transistors.

A very efficacious embodiment is one in which those ends of the conductors each coupled to all the cores of a given row which are remote from the position switch, are connected through a common conductor to the input terminal of the digit selector, so that a current pulse supplied to the position switch after receipt of the digit traverses successively the conductors corresponding to the position value and the value of the digit.

The members for determining the criteria may advantageously likewise comprise ferromagnetic cores each having two stable conditions of magnetisation, which cores initially are in the negative condition of magnetisation and may each be brought into the positive condition of magnetisation by means of one or more of the said shift circuits. Said cores may be restored to their initial position by similar means as are the other cores, after the investigation of the number is terminated.

In order that the invention may be readily carried into effect, one embodiment will now be explained in detail, by way of example, with reference to the accompanying diagrammatic drawing.

The circuit arrangement shown is intended for determining the exchange area from the selected office code in automatic trunk telephone calls. It has been assumed that the circuit arrangement is to be used in the system Amsterdam, for which the following division of zones applies:

Zone A: the systems, the numbers of which begin with the digit groups 290 and 296;

Zone B: the systems, the numbers of which begin with the digit groups 250, 251, 252, 254, 255, 256, 294, 295, 297, 298 and 299;

Zone C: the systems, the numbers of which begin with the digit groups 1, 22, 253, 3, 4, 5, 6 and 8.

The above-mentioned 21 digit groups thus constitute the significant groups of digits in the sense of the present invention. They contain at the most three digits so that digits of significant digit groups may occur in the positions 1, 2 and 3.

According to the invention, a plurality of ferromagnetic cores each having two stable conditions of magnetisation is provided for each position, that is to say, cores K11 and K12 for the first position, cores K21, K22 and K23 for the second position, and cores K31, K32, K33 and K34 for the third position. Said cores will be referred to hereinafter as "digit cores." The circuit arrangement also contains three cores KA, KB and KC, which will be referred to hereinafter as criterion cores and of which the ultimate condition of magnetisation, after dealing with a selected office code, constitute the criterion for the exchange area applicable. The criterion cores could be replaced, if desired, by other members for determining a criterion, for example by relays. The two conditions of magnetisation of the digit cores and criterion cores, which usually have the form of ferrite rings, will be referred to as the positive and the negative condition respectively, which terms in themselves are arbitrary.

The digit cores each comprise a shift circuit by means of which they are coupled either directly to one criterium core, or to one or more cores for the next position. For the core K12 said shift circuit comprises, for example a conductor SL which is coupled to the core and the ends of which are connected through a rectifier G to the terminals of a capacitor C, which terminals are also connected through a resistor R to a conductor ML which is coupled to the cores K21, K22 and K23. The rectifier G has a polarity such that the capacitor C is charged by the voltage induced in the conductor SL, when the core K12 is brought from the positive condition of magnetisation into the negative, whereas the capacitor is not charged when the core K12 is brought from the negative condition of magnetisation into the positive. In the first-mentioned case, the voltage of the capacitor brings about a current in the conductor ML, resulting in the cores K21, K22 and K23 being brought from the negative condition of magnetisation into the positive. In the second case, the condition of magnetisation of the cores K21, K22, and K23 remains unchanged. The shift circuits of the other digit cores are designed in a similar manner and have a similar performance.

As may be seen from the drawing, the core K22 is coupled by means of a shift circuit to the cores K31 and K32, whilst the core K23 is coupled in a similar manner to the cores K33 and K34 and the core K33 is coupled to the criterion core KA. The cores K31 and K34 are coupled through shift circuits having a common capacitor (C) to the criterion core KB, the cores K11, K21 and K32 being coupled in a similar manner to the criterion core KC.

The digit cores belonging to a given position are coupled to a position conductor which is indicated by L1 for the first position, by L2 for the second position, and by L3 for the third position. The conductor L1 is thus coupled to the cores K11 and K12, the conductor L2 to the cores K21, K22 and K23, and the conductor L3 to the cores K31, K32, K33 and K34. The conductors L1, L2 and L3 are connected to the output terminals of a position switch PS, which is shown as a rotary switch, but may alternatively be designed as a pyramid of relay contacts, electron valves or transistors. Those ends of the conductors L1, L2 and L3 which are remote from the position switch (at the right in the drawing) are connected to a common conductor M which leads to the input terminal of a digit selector CS. This digit selector, which is shown as a rotary switch, but may alternatively be designed as a pyramid of relay contacts, electron valves or transistors, has ten output terminals numbered with the digits from 1 to 0, to each of which a conductor N is connected. Each conductor N is coupled to one or more digit cores in a pattern determined by the composition of the significant groups of digits and is connected, at its free end, to a common earthed lead E.

In the case under consideration, the conductors N, connected to the terminals 1 to 0, are coupled to the digit cores in the pattern given below:

| Terminal: | Cores |
|---|---|
| 1 | K11, K31. |
| 2 | K21, K31, K12. |
| 3 | K11, K32. |
| 4 | K11, K31, K34. |
| 5 | K11, K31, K22, K34. |
| 6 | K11, K31, K33. |
| 7 | K34. |
| 8 | K11, K34. |
| 9 | K23, K34. |
| 0 | K31, K33. |

Finally, both the digit cores and the criterion cores are coupled to a conductor T, which serves to restore the cores, after dealing with an office code, to their initial condition of magnetisation and which, for this purpose, may be connected through a switch TS to a voltage source. The initial condition of magnetisation is the positive for the cores K11 and K12 which belong to the first position, and the negative condition for all the other cores. The coupling between the conductor T and the cores K11 and K12 must thus be opposite to its coupling to the other cores. This is shown diagrammatically in the figure in that the conductor T traverses the cores K11 and K12 from the right to the left and the other cores from the left to the right.

The digit selector CS is re-adjusted each time by the sequential digits of the office code. The position switch PS is switched on one step after each digit.

The circuit arrangement described operates as follows:

The cores K11 and K12 are initially in the positive condition of magnetisation, whereas all the other cores are in the negative condition of magnetisation. Upon receipt of the first digit of the office code, the digit switch CS is brought into the position corresponding thereto, while the position switch PS makes one step and is thus adjusted to the conductor L1. Subsequently a current pulse supplied through a terminal A, flows from the switch PS through the conductors L1 and M to the digit selector CS and hence through the conductor N corresponding to the selected digit to the earthed lead E. The current flowing in the conductor L1 and in the relevant conductor N is in itself too weak to change the condition of magnetisation of the cores. A change in the condition of magnetisation can occur only if the said currents coincide. If the first digit of the office code is 1, 3, 4, 5, 6 or 8, such coincidence occurs for the core K11, which is thus brought from the positive condition of magnetisation into the negative. In this case, the shift circuit coupled to the core K11 becomes operative so that the criterion core KC is brought from the negative condition of magnetisation into the positive and hence the criterion for exchange area C is established. The further digits of the office code are then unimportant for the determination of the exchange area.

If the first digit of the office code is a 2, coincidence occurs for the core K12, which is thus brought into the negative condition, the cores K21, K22 and K23 being brought from the negative condition into the positive by means of the relevant shift circuit.

Immediately after the occurrence of the said current pulse, the digit selector CS is restored to its initial position. Upon receipt of the second digit, the digit selector is re-adjusted, while the position switch PS makes one step. A current pulse is subsequently supplied through terminal A to the conductor L2 and through conductor M to the conductor N which corresponds to the selected digit. Coincidence occurs for the core K21 if the selected digit is a 2, for the core K22 if the selected digit is a 5, and for the core K23 if the selected digit is a 9. If the first digit were a 1, 3, 4, 5, 6 or 8, such coincidence has no consequences, since the cores K21, K22, K23 then are in the negative condition. However, if the first digit had been a 2, so that the said cores are in the positive condition, the core for which coincidence occurs is restored to the negative condition. If, in the last-mentioned case, the second digit is a 2, the criterion core KC is brought into the positive condition through the shift circuit of the core K21, so that the criterion for the exchange area C is established; the third digit is then irrelevant for the determination of the area. If the second digit is a 5, the cores K31 and K32 are brought into the positive condition through the shift circuit of core K22; if the second digit is a 9, this takes place for the cores K33 and K34 through the shift circuit of core K23. The digit selector CS is subsequently restored to its initial condition.

Upon receipt of the third digit, the digit selector is again adjusted, while the position switch PS is again switched on one step. The current pulse is now supplied to the conductor L3. Coincidence occurs for the core K31, if the third digit is a 0, 1, 2, 4, 5 or 6, for the core K32 if the third digit is a 3, for the core K33 if the third digit is a 6 or a 0, and for the core K34, if the third digit is a 4, 5, 7, 8 or 9. Consequently, if the first two digits constituted the group 25, the criterion core KB is brought into the positive condition if the third digit is a 0, 1, 2, 4, 5 or 6, and similarly the criterion core KC if the third digit is a 3. If the first two digits constituted the group 29, the criterion core KA is brought into the positive condition if the first digit is a 0 or a 6, and similarly the criterion core KB if the third digit is a 4, 5, 7, 8 or 9. For all the other values of the first two digits, the coincidence remains without effect. The zone criterion is thus also established for the cases in which the office code begins with the digits 25 or 29. The digit selector CS may now be made inoperative, if desired.

In order to restore the circuit arrangement to its initial condition after the call is over, or after transmission of the zone criterion to a time meter, the switch TS is closed, whereupon a backsetting pulse is applied to a terminal B. This backsetting pulse restores the cores K11 and K12 to their positive condition and all the other cores to their negative condition. Insofar one or more shift circuits are then made operative, the effect thereof is prevented by the current present in the conductor T.

What is claimed is:

1. An electric pulse data processing circuit for determining the occurrence of a predetermined signal, comprising a source of said signals, a plurality of rows of memory elements, each said row having a plurality of said elements, said elements each having first and second states, means connected to said elements to initially bring the elements of one row to said first state and the elements of another row to said second state, means connected to said source for bringing selected elements of said one row to said second state and subsequently bringing selected elements of said other row to said second state, and means coupling predetermined elements of said one row to predetermined elements of said other row to bring said predetermined elements of said other row into said first state when the elements of said first row coupled thereto are brought into said second state, whereby the states of said elements of said other row indicate the presence or absence of said predetermined signal.

2. A circuit for testing information corresponding to groups of at least two sequential numbers for the occurrence of a predetermined number comprising a first row of a plurality of memory elements having first and second states, at least one other row of a plurality of memory elements also having first and second states, means presetting the elements of said first row in said first state and the elements of said second row in said second state, means connected to apply information relating to the first number of said sequential numbers to predetermined elements of said first row to change the state thereof, means coupling predetermined elements of said first row to predetermined elements of said second row to effect a change of state therein upon change of state in said coupled predetermined elements of said first row, and means connected to subsequently apply information relating to the second number of said sequential numbers to predetermined elements of said second row, whereby predetermined elements of said second row that changed state due to coupling with elements of said first row are returned to their original states.

3. A circuit for testing information relating to number groups for the occurrence of predetermined numbers comprising a plurality of rows of memory elements, each digit position of said group corresponding to different row of said elements, a first plurality of conductors each corresponding to a different digit, means selectively coupling said conductors to said elements, a second plurality of conductors each coupled to the elements of a different row, means selectively coupling each of said second group conductors with a first group conductor, each of said elements having first and second states, means initially bringing the elements of one of said rows in said first state and the elements of another row in said second state, means sequentially energizing said second group conductors whereby elements of said one row which are coupled to the same first group conductor as the second group conductor corresponding to said one row are brought into said second state, and subsequently elements of said other row in said first state which are coupled to the same first group conductor as the second group conductor corresponding to said other row are brought into said second state, and means selectively coupling elements of said one row with elements of said other row whereby elements of said second row are brought into said first state when the elements of said one row coupled thereto are brought into said second state.

4. A circuit for testing for the presence of significant digit groups of numbers, wherein the digits may occur in two or more positions, said circuit comprising a different row of ferromagnetic cores corresponding to each position of said group, said cores each having first and second stable states of magnetization, means for initially setting the cores of the row corresponding to the first digit position to said first state and for initially setting the cores of said other rows of said second state, a first group of a plurality of first conductor means each corresponding to a different digit, means selectively coupling said first group of conductor means to said cores, a second group of a plurality of conductor means, the conductor means of said second group each being coupled to all of the cores of a different row, means sequentially applying a current pulse to each conductor means of said second group, means selectively applying a current pulse to said first group of conductor means whereby a current pulse occurs in each conductor means of said second group at the same time that a pulse occurs in the conductor means of said first group corresponding to the digit at the respective digit position, whereby cores in said first state are selectively brought to said second state by coincidence, and means selectively coupling cores of each row to cores of the row corresponding to the next position for bringing predetermined cores of said row corresponding to the next position into said first state upon a change of state of the core coupled thereto.

5. The circuit of claim 4, in which said means for initially setting said cores comprises conductor means coupled in one direction to the cores of the row corresponding to the first digit position and in the opposite direction to the remainder of said cores.

6. The circuit of claim 4, in which said means for sequentially applying a current pulse to said second conductors comprises a multiposition switch having a common contact connected to a source of current pulses, and a separate contact connected to each second conductor.

7. The circuit of claim 4, comprising a digit selector switch having a common contact connected to one end of said conductor means of said second group, a separate contact connected to one end of each conductor means of said first group, the other ends of said conductor means of said first group being connected together, and means sequentially connecting a current source between the other ends of said conductor means of said second group and the other ends of said first conductor means of said first group.

8. The circuit of claim 4, comprising criterion determining means connected to selected cores for indicating the presence of significant digit groups.

9. The circuit of claim 8, in which said criterion determining means comprises a plurality of ferromagnetic cores having first and second stable states, and means for initially bringing said cores to said second state.

References Cited in the file of this patent

UNITED STATES PATENTS 2,904,636 McKim et al. ____________ Sept. 15, 1959

UNITED STATES PATENT OFFICE

CERTIFICATE OF CORRECTION

Patent No. 3,123,809 March 3, 1964

Johannes Martinus Brouwer

It is hereby certified that error appears in the above numbered patent requiring correction and that the said Letters Patent should read as corrected below.

Column 6, line 14, after "to" insert -- a --; line 45, for "of", first occurrence, read -- to --.

Signed and sealed this 18th day of August 1964.

(SEAL)
Attest:

ERNEST W. SWIDER
Attesting Officer

EDWARD J. BRENNER
Commissioner of Patents